United States Patent [19]

Nishimura

[11] Patent Number: 4,717,174
[45] Date of Patent: Jan. 5, 1988

[54] DRIVING FORCE TRANSMITTING STRUCTURE FOR AUTOMATIC SEATBELT SYSTEM

[75] Inventor: Yuji Nishimura, Aichi, Japan

[73] Assignee: Kabushiki Kaisha Tokai-Rika-Denki-Seisakusho, Japan

[21] Appl. No.: 921,115

[22] Filed: Oct. 21, 1986

[30] Foreign Application Priority Data

Oct. 25, 1985 [JP] Japan .............................. 60-163985[U]

[51] Int. Cl.⁴ .............................................. B60R 21/10
[52] U.S. Cl. ...................................... 280/804; 297/469
[58] Field of Search ............... 280/804, 803, 802, 807, 280/808, 806; 297/468, 469; 403/341, 353

[56] References Cited

U.S. PATENT DOCUMENTS

| | | | |
|---|---|---|---|
| 1,856,917 | 5/1932 | Jordan et al. | 403/341 |
| 4,400,014 | 8/1983 | Takada | 280/806 |
| 4,462,613 | 7/1984 | Nishimura et al. | 280/804 |
| 4,623,168 | 11/1986 | Yokote | 280/804 |
| 4,635,964 | 1/1987 | Ryu | 280/804 |

FOREIGN PATENT DOCUMENTS 55-28552 2/1980 Japan .

Primary Examiner—Richard A. Bertsch
Attorney, Agent, or Firm—Sixbey, Friedman & Leedom

[57] ABSTRACT

A seatbelt system for a vehicle which enables a webbing to be automatically fastened to the body of an occupant includes a tape subjected to driving force derived from a motor. The distal end portion of the tape is provided with a plurality of neck portions. Projecting members are provided on a slider which retains the webbing. The projecting members are fitted into the neck portions, respectively, so that the driving force from the motor is transmitted to the slider while being distributed among a plurality of portions of the tape. Thus, even when the tape has a relatively small width, the driving force is reliably transmitted to the slider and hence the webbing.

24 Claims, 6 Drawing Figures

DRIVING FORCE TRANSMITTING STRUCTURE FOR AUTOMATIC SEATBELT SYSTEM

BACKGROUND OF THE INVENTION

1. Field of the Invention

The present invention relates to an automatic seatbelt system for a vehicle designed to protect an occupant in an emergency situation of the vehicle and to enable a webbing to be automatically fastened to the occupant's body after he has been seated in a seat. More particularly, the present invention pertains to a driving force transmitting structure for use in such automatic seatbelt system.

2. Description of the Related Art

One type of automatic seatbelt system has already been proposed which employs a flexible thick-walled tape for transmitting tensile and compressive forces (see the specification of Japanese Utility Model No. 28552/1980).

In this conventional automatic seatbelt system, a thick-walled tape is provided with a plurality of openings at predetermined spacings, and a sprocket wheel of a driving means is engaged with the openings in the tape to transmit tensile or compressive force to the tape in the longitudinal direction thereof so as to activate an occupant restraining webbing to move along a guide rail through a slider, thereby allowing the webbing to be automatically fastened to or unfastened from the occupant's body.

The above-described conventional arrangement suffers, however, from the following disadvantage. Namely, the slider is connected to a portion of the tape in such a manner that the intermediate portion of the slider is passed through an opening provided in said portion of the tape, and therefore this opening needs to have a relatively large area. For this reason, the width and thickness of the tape must be sufficiently increased so that the sliding connecting portion, which has a relatively large opening area, can satisfactorily bear any tensile force applied thereto. Otherwise, it is necessary to employ a material for the tape which is able to bear a relatively large tensile force.

SUMMARY OF THE INVENTION

In view of the above circumstances, it is a primary object of the present invention to provide a driving force transmitting structure for an automatic seatbelt system which enables driving force to be reliably transmitted to a webbing even when a flexible continuous member for transmitting tensile and compressive forces has a relatively small cross-sectional area.

To this end, the present invention provides a driving force transmitting structure for use in an automatic seatbelt system designed to move a slider along a guide rail by means of driving force derived from driving means, so as to connect a continuous member subjected to the driving force to the slider, the structure comprising: a plurality of neck portions formed on the distal end portion of the continuous member in such a manner that the neck portions are spaced apart from each other in the longitudinal direction of the continuous member; and intermediate piece moved through the guide rail together with the slider; and projecting members formed on the intermediate piece and fitted into the neck portions, respectively, the projecting members being adapted to transmit the driving force to the intermediate piece in such a manner that the driving force is distributed among a plurality of portions of the joint between the continuous member and the intermediate piece.

By virtue of the above-described arrangement of the present invention, it is unnecessary to secure the slider to the continuous member through an opening provided in the latter, and the neck portions of the continuous member are reliably engaged with the projecting members to transmit the driving force to the webbing. Since the plurality of neck portions have different widths in such a manner that one neck portion which is closer to the distal end of the continuous member than another has a smaller width that that of the latter, the driving force is transmitted through these neck portions while being distributed among a plurality of portions of the continuous member. Thus, there is no fear of any large load concentrating on one portion of the continuous member.

DESCRIPTION OF THE PREFERRED EMBODIMENTS

Preferred embodiments of the present invention will be described hereinunder in detail with reference to the accompanying drawings.

Figure 2:
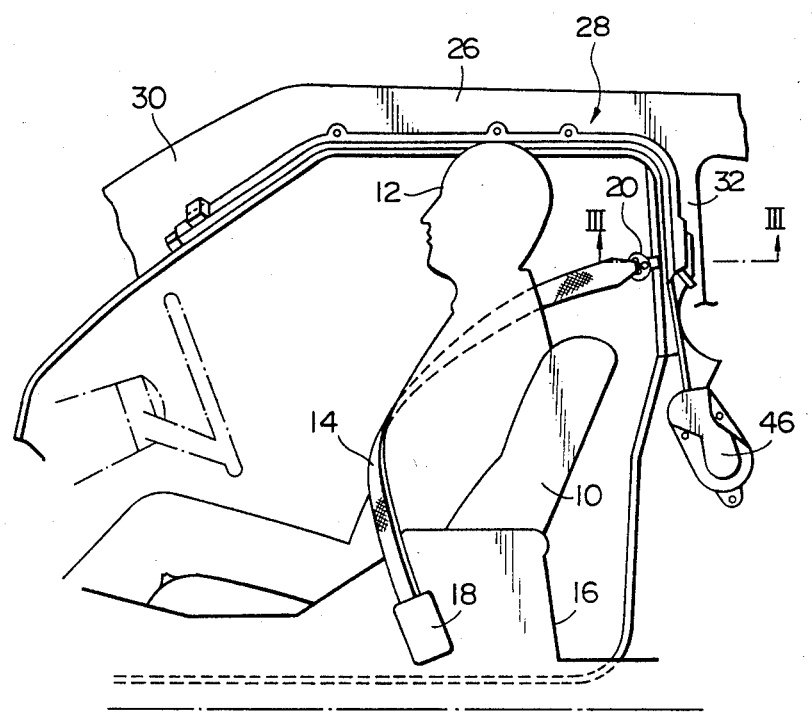
FIG. 2 is a side view of an automatic seatbelt system to which the first embodiment is applied.

Referring first to FIG. 2, there is shown an automatic seatbelt system to which one embodiment of the present invention is applied. This seatbelt system is arranged such that a webbing 14 is automatically fastened to the body of an occupant 12 seated in a seat 10. The webbing 14 is wound up into a webbing retractor 18 from one end thereof, the retractor 18 being disposed within a console box 16 provided in the substantially central portion of the vehicle. The retractor 18 is adapted to wind up the webbing 14 by means of biasing force. The retractor 18 incorporates an inertia type lock mechanism which instantaneously stops the webbing 14 from being unwound when an emergency situation of the vehicle occurs.

Figure 1:
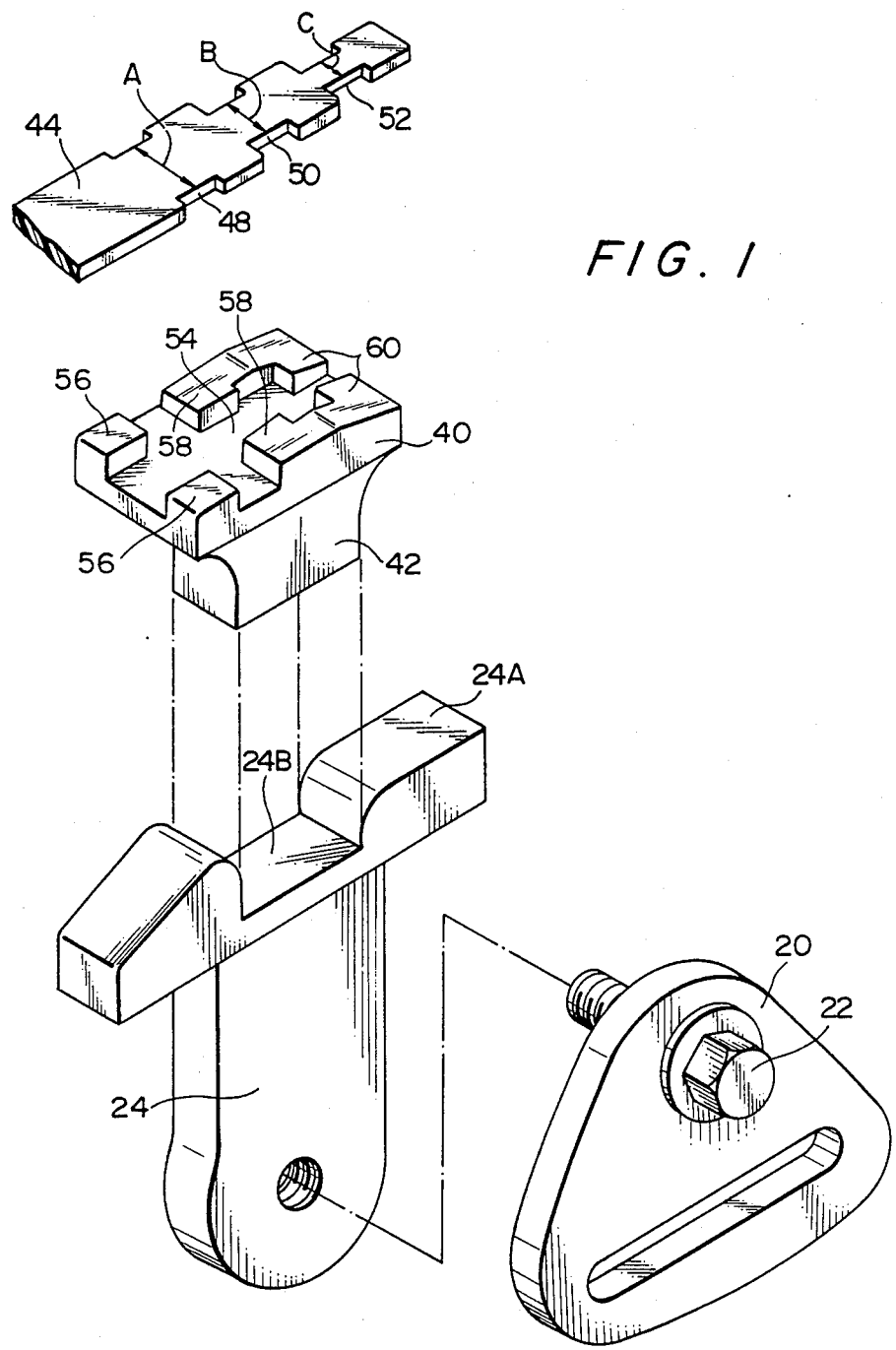
FIG. 1 is an exploded perspective view showing a first embodiment of the driving force transmitting structure for an automatic seatbelt system according to the present invention.

The intermediate portion of the webbing 14 is used to fasten the body of the occupant 12. An anchor plate 20 is connected to the other end portion of the webbing 14. The anchor plate 20 is pivotally supported by a slider 24 through a bolt 22 as shown in FIG. 1.

Figure 3:
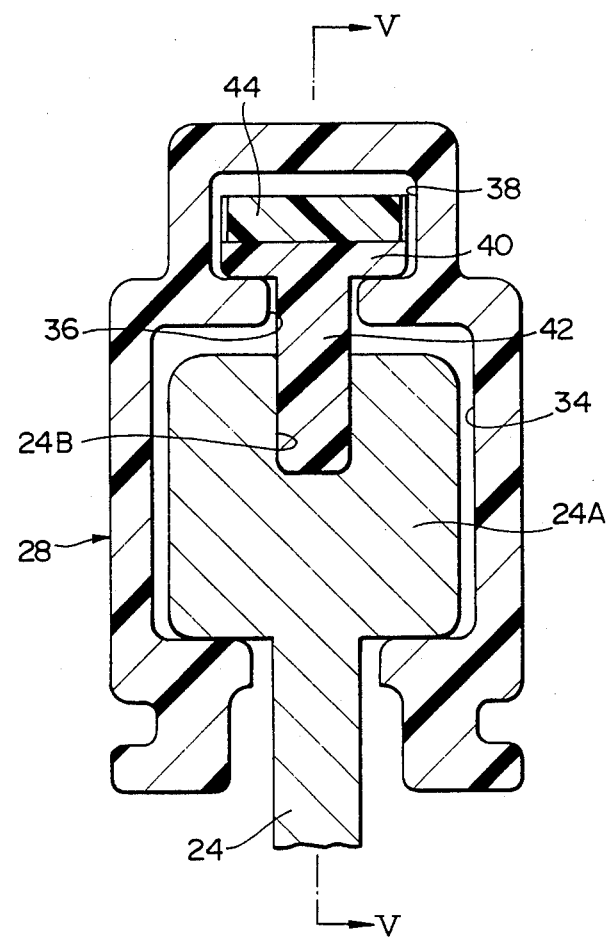
FIG. 3 is a sectional view taken along the line III—III of FIG. 2, which also corresponds to a sectional view taken along the line III—III of FIG. 4.

The slider 24 is movable in the longitudinal direction of the vehicle while being guided by a guide rail 28 which is rigidly secured to a roof side member 26 of the vehicle in such a manner that the guide rail 28 extends in the longitudinal direction of the vehicle. One end portion of the guide rail 28 which is closer to the front end of the vehicle extends obliquely downward along a front pillar 30, while the other end portion of the guide rail 28, which is closer to the rear end of the vehicle, extends downward along a center pillar 32. The cross-section of the guide rail 28 which is taken along a plane perpendicular to the longitudinal direction thereof has a configuration such as that shown in FIG. 3. More specifically, the guide rail 28 has a guide groove 34 for accommodating an enlarged head portion 24A of the slider 24. The guide rail 28 is further provided with a guide groove 38 which is adjacent to and communicated with the guide groove 34 through the narrowed portion 36.

The guide groove 38 is adapted to be able to accommodate and guide an intermediate piece 40 in the longitudinal direction of the guide rail 28. As shown in FIG. 1, the intermediate piece 40 has a projecting base portion 42 which is received in a recess 24B formed in the enlarged head portion 24A of the slider 24, so that the intermediate piece 40, together with the slider 24, is moved in the longitudinal direction of the guide rail 28.

A flexible tape 44 for transmitting driving force is tightly received in the guide groove 38 so that the tape 44 is movable in the longitudinal direction of the guide rail 28.

More specifically, the tape 44 is guided through the guide groove 38 and wound up into a driving means 46 disposed at the lower side of the center pillar 32 as shown in FIG. 2. In addition, the tape 44 is subjected to compressive or tensile force from the driving means 46.

Figure 4:
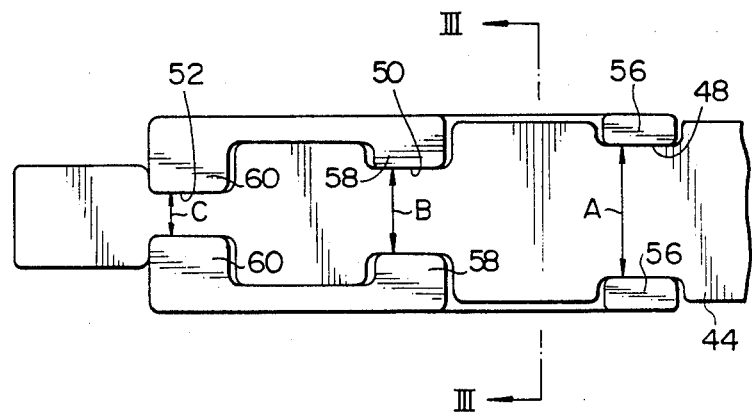
FIG. 4 is a plan view showing a flexible tape and an intermediate piece in their connected state.
Figure 5:
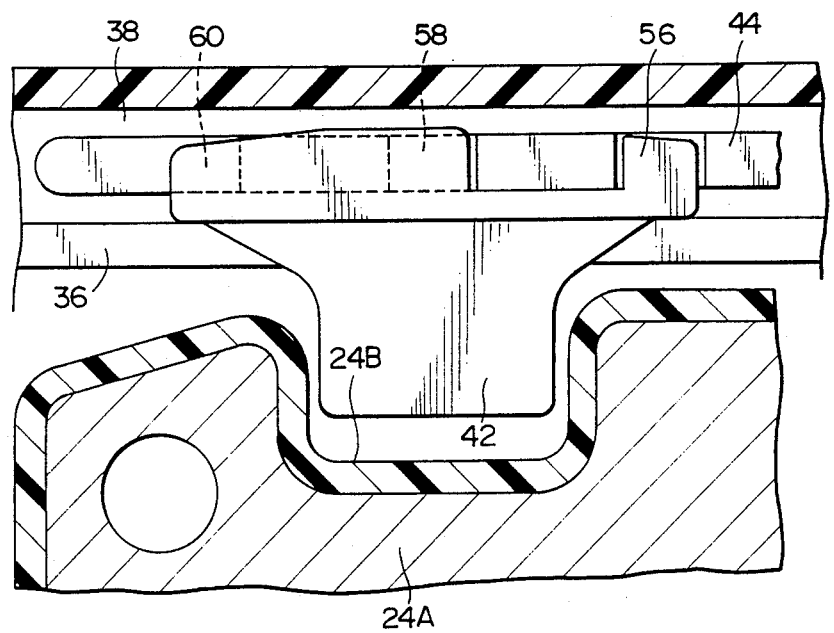
FIG. 5 is a sectional view taken along the line V—V of FIG. 3.

As shown in FIGS. 1 and 4, three neck portions 48, 50 and 52 are provided at a portion of the tape 44 which is connected to the intermediate piece 40.

The neck portion 48 is defined by notches which are provided in both edges, respectively, of the tape 44 so that the width of the neck portion 48 equals the dimension A. The neck portion 50 is disposed closer to the distal end of the tape 44 than the neck portion 48, the width B of the neck portion 50 being smaller than the width A of the neck portion 48. The neck portion 52 is provided at a position which is closer to the distal end of the tape 44 than the neck portion 50, the width C of the neck portion 52 being smaller than the width B of the neck portion 50.

On the other hand, the intermediate piece 40 is provided at its top with a groove 54 for tightly receiving the portion of the tape 44 which includes the neck portions 48, 50 and 52. The groove 54 is defined by three pairs of opposing projecting members 56, 58 and 60, which are provided on the top of the intermediate piece 40 in such a manner that the projecting members which constitute each pair project toward each other. These projecting members 56, 58 and 60 are tightly received in the notches which define the neck portions 48, 50 and 52 to transmit driving force from the tape 44 to the slider 24.

Thus, driving force which is to be transmitted is distributed among the neck portions 48, 50, 52 and each shoulder of the projecting members 56, 58, 60 so as to be born thereby. More specifically, the neck portion 48 is subjected to a relatively large tensile or compressive force, but it has a relatively large width and therefore is capable of bearing a relatively large tensile force. The neck portion 50 is subjected to a tensile or compressive force which is smaller than that applied to the neck portion 48, but it has a width which enables such tensile or compressive force to be born. The same is the case with the neck portion 52.

The number of neck portions is not necessarily limitative to three as in the case of this embodiment, and any number, except for one, of neck portions may be provided. In addition, spacings between a plurality of neck portions are not necessarily needed to be equal to each other.

Further, the width of a portion defined between the neck portions 50 and 52 is smaller than that of a portion defined between the neck portions 48 and 50, and the width of the distal end portion of the tape 44 is smaller than the width of the portion defined between the neck portions 50 and 52.

The following is a description of the operation of this embodiment.

FIG. 2 shows the occupant 12 seated in the seat 10 and fastened with the webbing 14.

When the vehicle runs into an emergency situation, the retractor 18 stops the webbing 14 from being unwound, so that the body of the occupant 12 is reliably restrained by the webbing 14.

When the occupant 12 opens the door in order to leave the vehicle after a normal running of the vehicle, the driving means 46 is activated, and the flexible tape 44 is subjected to compressive force to move toward the front end of the vehicle along the guide rail 28. This compressive force is transmitted to the projecting members 56, 58 and 60 through the neck portions 48, 50 and 52. In consequence, the intermediate piece 40, together with the slider 24, is moved toward the longitudinal end of the guide rail 28 which is closer to the front end of the vehicle. Thus, the occupant 12 is automatically released from the webbing fastening condition and is allowed to leave the vehicle.

When the occupant 12 re-enters the vehicle and closes the door after seating himself in the seat 10, the driving means 46 rotates in the reverse direction to the above. In consequence, the tape 44 is subjected to tensile force to bring the webbing 14 back to the position shown in FIG. 2, thus enabling the webbing 14 to be automatically fastened to the body of the occupant 12.

Figure 6:
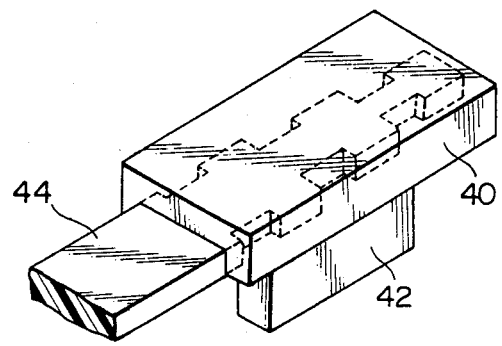
FIG. 6 is a perspective view showing a second embodiment of the present invention.

Referring next to FIG. 6, there is shown a second embodiment of the present invention. In this embodiment, the intermediate piece 40 is formed such as to surround integrally all of the portion of the flexible tape 44 which is provided with the neck portions 48, 50 and 52. More specifically, after the distal end portion of the tape 44 has been accommodated in the intermediate piece 40 shown in FIG. 1, a plate member is rigidly secured to the upper side of the intermediate piece 40 so that these members are connected together in one unit. In an actual manufacturing process, the intermediate piece 40 is formed by means of molding so that the distal end portion of the tape 44 is rigidly secured to the intermediate piece 40. Accordingly, it is possible, in this embodiment, to reliably prevent the tape 44 from coming off the intermediate piece 40 in the upward direction as viewed in FIG. 1.

What is claimed is:

1. An automatic seatbelt system for a vehicle designed to automatically fasten a webbing to the body of an occupant, comprising:
  (a) a slider movable in the longitudinal direction of the vehicle and retaining one end of said webbing;
  (b) driving means secured to the vehicle body;
  (c) a flexible continuous member connected to said slider at an end and to said driving means at the other end, which is subjected to tensile and compressive forces from said driving means so as to move said slider; and (d) driving force transmitting means including a plurality of neck portions defined by notches oppositely formed along both longitudinal sides of an end of said continuous member in such a member as to be spaced apart from each other in the longitudinal direction thereof, and projecting members oppositely longitudinally provided adjacent to each side on an upper face of said slider for engaging with said neck portions, respectively, to uniformly transmit substantially the same amount of driving force through each of said neck portions of said continuous member to each of said projecting members of said slider.

2. An automatic seatbelt system according to claim 1, wherein the respective widths of said neck portions are reduced stepwise from the side of said continuous member toward the end thereof, and the widths of said projecting members are reversely increased toward the end thereof to engage therewith.

3. An automatic seatbelt system according to claim 1, wherein said slider includes an intermediate piece on which said projecting members are provided.

4. An automatic seatbelt system according to claim 1, wherein said continuous member is in the shape of a thick walled tape.

5. An automatic seatbelt system according to claim 4, wherein said neck portions have respectively different cross-sectional areas in such a manner that one neck portion which is closer to the distal end of said continuous member than another has a smaller cross-sectional area than that of the latter.

6. An automatic seatbelt system according to claim 1, wherein a groove is formed between the opposite projecting members in which the notched end portion of said continuous member is received to move together with aid slider, said projecting members being formed integral with the bottom surface of said groove such as to project therefrom.

7. An automatic seatbelt system according to claim 6, wherein said groove is provided in an intermediate piece which moves together with said slider.

8. An automatic seatbelt system according to claim 7, wherein a portion of said continuous member which includes said neck portions is buried in said intermediate piece.

9. An automatic seatbelt system according to claim 7, wherein said intermediate piece has a projecting base portion which is received in a recess provided in said slider, so that said intermediate piece moves together with said slider.

10. An automatic seatbelt system according to claim 1, wherein the distal end portion of said continuous member which is contiguous with said neck portions has a reduced width.

11. An automatic seatbelt system for a vehicle wherein, after an occupant has entered the vehicle, a webbing is automatically fastened to the occupant's body by means of driving force derived from a motor, which comprises:

(a) a guide rail laid along the vehicle body;
(b) a slider having opposing projecting members provided along each side of an upper face, and being movable along said guide rail and retaining one end of said webbing so as to move it;
(c) a thick-walled tape disposed within said guide rail and secured one end thereof to said slider, the other end of said tape being subjected to the driving force from said motor; and
(d) driving force transmitting means including a plurality of neck portions defined by opposing notches formed along a portion of said tape near the distal end thereof, said neck portions having different widths such that one neck portion which is closer to said distal end than another has a smaller width than that of the latter, wherein said projecting members of said slider are fitted into the notched defining said neck portions, respectively, thereby connecting together said tape and said slider, and thus transmitting the tape driving force to said slider in such a manner that said driving force is distributed substantially uniformly among said plurality of neck portions of said tape.

12. An automatic seatbelt system according to claim 11, wherein said projecting members are spacedly provided on an intermediate piece which is secured to said slider.

13. An automatic seatbelt system according to claim 12, wherein said end portion on which is formed said portions of the tape and said projecting members provided on said intermediate piece are integrally connected by molding.

14. An automatic seatbelt system according to claim 11, wherein a groove is formed between the opposite projecting members in which the notched end portion of said tape is received to move together with said slider, said projecting members being formed integral with the bottom surface of said groove such as to project therefrom.

15. An automatic seatbelt system according to claim 14, wherein a portion of said tape which includes said neck portions is buried in said intermediate piece.

16. An automatic seatbelt system according to claim 11, wherein the distal end portion of said tape which is contiguous with said neck portions has a reduced width.

17. A driving force transmitting structure for use in an automatic seatbelt system designed to move a slider along a guide rail by means of driving force derived from a driving means which connects an elongated continuous member subjected to said driving force to said slider, comprising:

(a) a plurality of neck portions defined by opposing notches formed along longitudinal sides on the distal end portion of said continuous member in such a manner that said neck portions are spaced apart from each other along the longitudinal axis of said continuous member;
(b) an intermediate piece disposed on said slider which is movable along said guide rail together with said slider; and
(c) projecting members oppositely formed along said intermediate piece receivable within said notches defining said neck portions, respectively, said projecting members being adapted to transmit said driving force to said intermediate piece in such a manner that said driving force is distributed uniformly among a plurality of shoulder portions of said projecting members of said intermediate piece adjoining said neck portion of aid continuous member.

18. A driving force transmitting structure according to claim 17, wherein said plurality of neck portions have different widths in such a manner that one neck portion which is closer to the distal end of said continuous member has a smaller width than that of another which is closer to said motor.

19. A driving force transmitting structure according to claim 17, wherein said intermediate piece is provided with a groove for receiving a portion of said continuous member.

20. A driving force transmitting structure according to claim 17, wherein a portion of said continuous member which includes said neck portions is buried in said intermediate piece.

21. A driving force transmitting structure according to claim 17, wherein the distal end portion and portions of said continuous member which are defined between said neck portions are reduced in width toward the the distal end portion of said continuous member in a manner similar to that of said neck portions.

22. A driving force transmitting structure according to claim 17, wherein the driving means is an electric motor.

23. A driving force transmitting structure for use in an automatic seatbelt system designed to move a slider along a guide rail by means of driving force derived from said motor which interconnects an elongated continuous member subjected to said driving force to said slider, comprising:
    (a) a plurality of spaced apart neck portions formed along the longitudinal axis of the distal end portion of said continuous member, wherein the widths of said neck portion successively diminish toward the distal end of aid continuous member;
    (b) an intermediate piece adapted to move along said guide rail together with said slider; and
    (c) projecting members formed on said intermediate piece and received around said neck portions, respectively, said projecting members being adapted to transmit said driving force to said intermediate piece in such a manner that said driving force is substantially evenly distributed among a plurality of portions of the joint between said continuous member and said intermediate piece, said portions of said continuous member which are disposed between said neck portions being reduced in width toward the distal end portion of said continuous member in a manner similar to that of said neck portions.

24. An automatic seatbelt system for a vehicle designed to automatically fasten a webbing to the body of an occupant, comprising:
    (a) a slider movable along the length of the vehicle which retains an end of the webbing;
    (b) driving means secured to the vehicle body;
    (c) a flexible continuous member connected to the driving means for applying tensile and compressive drive forces to the slider, and
    (d) a driving force transmitting means formed in part by an end of the flexible continuous member, wherein the cross-sectional area of said end is equal to or less than the cross-sectional area of the balance of the continuous member, including a plurality of notches in said end of the continuous member, and a plurality of complementary projections in said slider that are interfittable with said notches, wherein said projections transmit said drive forces substantially uniformly along said distal end of said continuous member.

* * * * *